J. W. THOMPSON.
Valve-Gear for Steam-Engines.

No. 162,715. Patented April 27, 1875.

WITNESSES:
A Bennerkendorf
A. F. Terry

INVENTOR:
J. W. Thompson
BY
ATTORNEYS.

THE GRAPHIC CO.PHOTO-LITH.39 & 41 PARK PLACE, N.Y.

UNITED STATES PATENT OFFICE.

JOSEPH W. THOMPSON, OF SALEM, OHIO, ASSIGNOR TO HIMSELF AND BUCKEYE ENGINE COMPANY, OF SAME PLACE.

IMPROVEMENT IN VALVE-GEARS FOR STEAM-ENGINES.

Specification forming part of Letters Patent No. 162,715, dated April 27, 1875; application filed March 20, 1875.

*To all whom it may concern:*

Be it known that I, JOSEPH W. THOMPSON, of Salem, in the county of Columbiana and State of Ohio, have invented a new and Improved Automatic Cut-Off for Steam-Engines, of which the following is a specification:

The invention relates to the construction and arrangement of devices for connecting the main valve and its sliding cut-off valve with the eccentrics from which they derive motion, that of the cut-off valve being adjustable around its center of rotation, as hereinafter described.

Figure 1:
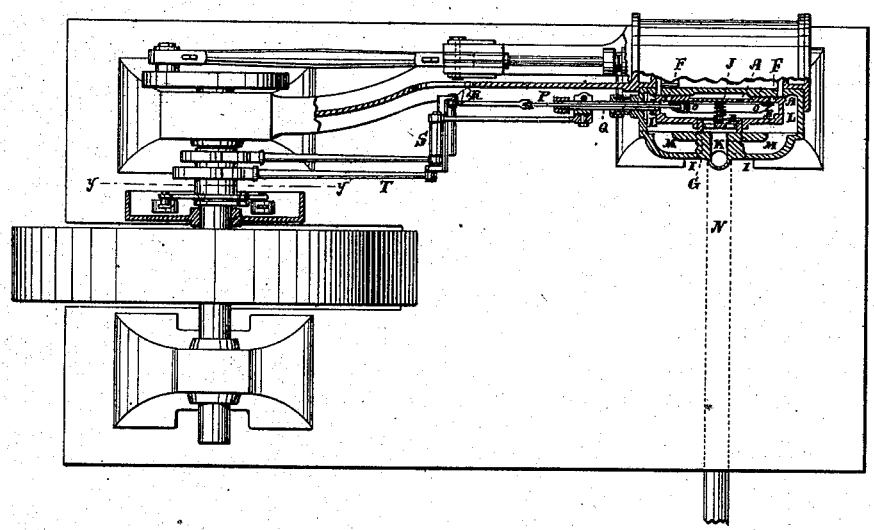
Figure 2:
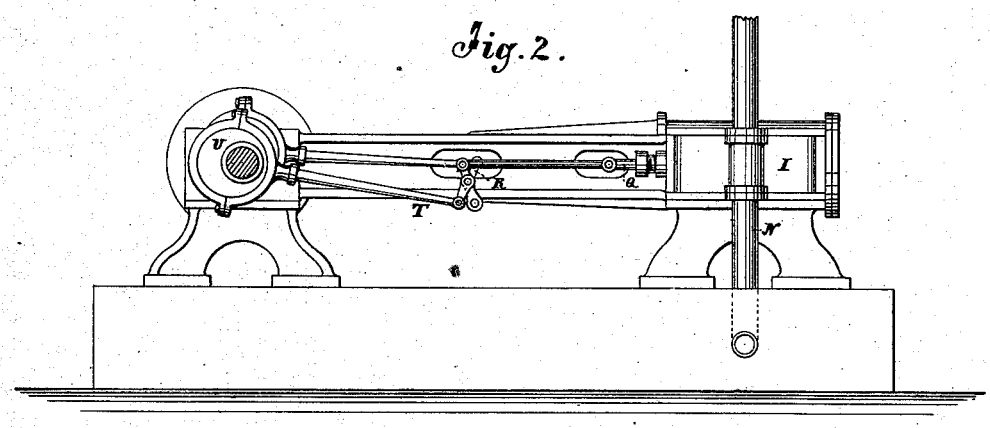
Figure 3:
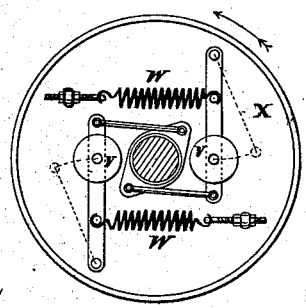
Figure 4:
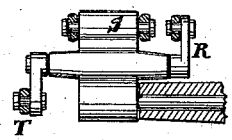

Figure 1 is a horizontal section of the engine. Fig. 2 is a side elevation. Fig. 3 is a section of the crank-shaft, showing an automatic regulator for the cut-off. Fig. 4 is a side elevation of the rock-arms for the main valve and the cut-off.

Similar letters of reference indicate corresponding parts.

A is the main valve, in which is a chamber, B, inclosed by the cover C, which has an opening, D, to admit live steam to the chamber for entering the ports E of the engine through the passages F in the valve. The opening D is also for balancing the valve by means of a packing-ring or piston, G, together with suitable steam-packing arranged in said opening to work against the face-plate H of the cover I of the steam-chest. J is a spring, used to keep the piston on the face-plate when the steam is shut off. The steam enters the chamber through the pipe K, and it exhausts at the ends of the valve through the steam-chest L into passages M in the steam-chest cover leading to the exhaust-pipe N. O is the cut-off valve, which is arranged in chamber B on the back of valve A. The stem P of this valve extends out of the steam-chest through the hollow tube Q, forming part of the main valve-stem, and it connects with its double-armed rock-shaft R in the line of the connection of the main valve-stem with its rock-arm S, and this rock-shaft R is pivoted on the rock-arm S at its middle, or thereabout. The eccentric rod T of the cut-off valve is connected to the rock-shaft R in the line of the pivot of the rock-arm S of the main valve, and the eccentric U for working it is fitted on the crank-shaft, so that it can be shifted around it for cutting off sooner or later, according to the speed of the engine, and in this example a regulator consisting of the balls V and springs W, attached to the disk X on the shaft, is combined with it for automatically shifting it; but any other approved regulator may be used.

A gear-wheel on the crank-shaft, contrived to be shifted in like manner by the governor and driving another wheel, having the valve-rod connected to a crank-pin on it, would be the equivalent of the shifting eccentric which I have shown and described.

Having thus described my invention, I claim as new and desire to secure by Letters Patent—

The double-armed rock-shaft R of the cut-off valve, mounted on the rock-arm S of the main valve, which is operated by a fixed eccentric, in combination with an eccentric arranged for adjustment around its center of motion, and the rods connecting said parts, whereby the movement of the cut-off is varied, as set forth, for the purpose specified.

JOSEPH W. THOMPSON.

Witnesses:
JOSEPH F. SMITH,
PETER AMBLER.